(12) United States Patent
O'Connor et al.

(10) Patent No.: US 8,498,404 B2
(45) Date of Patent: Jul. 30, 2013

(54) METHODS AND SYSTEMS FOR MONITORING CONTACT CENTER OPERATIONS

(75) Inventors: Neil O'Connor, Galway (IE); Paul D'Arcy, Limerick (IE)

(73) Assignee: Avaya Inc., Basking Ridge, NJ (US)

( * ) Notice: Subject to any disclaimer, the term of this patent is extended or adjusted under 35 U.S.C. 154(b) by 185 days.

(21) Appl. No.: 13/163,946

(22) Filed: Jun. 20, 2011

(65) Prior Publication Data

US 2012/0321059 A1    Dec. 20, 2012

(51) Int. Cl.
*H04M 3/00* (2006.01)
(52) U.S. Cl.
USPC .................................................. 379/265.06
(58) Field of Classification Search
USPC ..................... 379/265.06, 265.08, 265.03
See application file for complete search history.

(56) References Cited

U.S. PATENT DOCUMENTS

| | | |
|---|---|---|
| 2006/0038833 A1 | 2/2006 | Mallinson et al. |
| 2007/0242886 A1 | 10/2007 | St John |
| 2009/0003662 A1 | 1/2009 | Joseph et al. |
| 2011/0115816 A1 | 5/2011 | Brackney |
| 2012/0299961 A1* | 11/2012 | Ramkumar et al. .......... 345/632 |

FOREIGN PATENT DOCUMENTS

| | | |
|---|---|---|
| EP | 2426645 A1 | 3/2012 |
| WO | 2011100535 A1 | 8/2011 |

OTHER PUBLICATIONS

Patent Application No. 1122168.6, Avaya Inc., Great Britain Office Action dated Apr. 20, 2012, 7 pages.

* cited by examiner

*Primary Examiner* — Creighton Smith
(74) *Attorney, Agent, or Firm* — Maldjian Law Group LLC.; John P. Maldjian, Esq.; Alexander D. Walter, Esq.

(57) ABSTRACT

A console for monitoring contact center operations is provided. The console comprises a camera for capturing a field of view of a contact center environment and a screen for displaying the captured field of view. The camera further comprises an identifier recognition module for determining an identifier from an element in the captured field of view displayed on the screen; and an interface for transmitting a request including the identifier to a contact center server and receiving from the contact center server, information associated with the identifier; wherein the screen is further arranged to display an overlay of the information on the captured field of view, to create an augmented reality of the contact center environment on the screen.

45 Claims, 7 Drawing Sheets

METHODS AND SYSTEMS FOR MONITORING CONTACT CENTER OPERATIONS

BACKGROUND

1. Field of the Invention

The present invention relates to methods and systems for monitoring contact center operations.

2. Description of the Related Art

Contact centers, including traditional voice-only call centers as well as multimedia contact centers adapted to handle contacts in other media, employ numerous agents, having various skillsets or attributes, to service customer load. Meeting the needs of the customers in a timely and efficient manner is paramount to a successful and profitable contact center. Thus, it is often desirable for the real-time operation of the contact center to be monitored by a third party, such as a contact center supervisor. In this way, information deduced by the third party may be employed to more efficiently instruct the agents, to thereby improve the productivity of the contact center and the quality of service being provided to the customer.

Currently, contact center supervisors tend to employ two methods of monitoring the real-time operations of a contact center.

The first method involves utilizing interfaces provided at the supervisor's terminal, which are arranged to display real-time contact center and agent performance statistics. In particular, these interfaces allow supervisors to observe sessions between agents and customers, and to "whisper" or prompt agents with advice or answers where appropriate, unbeknownst to the customer. Furthermore, the statistics provided to the supervisors at their terminal by advanced contact center applications permit objective measurements that complement real-world observations, and allow supervisors to make adjustments of the contact center configurations as they deem fit.

The second method employed by the supervisors involves physically walking around the contact center work floor, observing the work of the agents. In particular, the supervisors are concerned with the interaction of the agents with their interfaces, such as agent desktop application activity, and, in the case that an agent is involved in a voice call session with a customer, observing the agent's side of the voice call session. This second method provides the supervisors with important insights into the behavior and reactions of the agents that may not necessarily be possible to infer from real-time statistic monitoring from the supervisor's terminal. In some cases, supervisors are equipped with a mobile software console capable of displaying a subset of contact center statistics, which can be employed whilst the supervisor walking about the contact center floor. However, such mobile software consoles are generally incapable of furnishing the supervisor with the extent of information available at their terminal.

In general, it is accepted that the most effective manner of monitoring contact centers is achieved by carrying out periodically both of the above-described methods.

Thus, there is a need for an improved method and system for monitoring contact center operations, and in particular, for monitoring agents of contact centers.

SUMMARY

According to a first aspect of the present invention, there is provided a console for monitoring contact center operations, the console comprising: a camera for capturing a field of view of a contact center environment; a screen for displaying the captured field of view; an identifier recognition module for determining an identifier from an element in the captured field of view displayed on the screen; and an interface for transmitting a request including the identifier to a contact center server and receiving from the contact center server, information associated with the identifier; wherein the screen is further arranged to display an overlay of the information on the captured field of view, to create an augmented reality of the contact center environment on the screen.

In an embodiment, the identifier is a label or tag selected from a group consisting of: 1 dimensional barcodes, 2 dimensional barcodes, QR codes, JAGTAGS, and RFIDs.

In an embodiment, the element is an agent or terminal of the contact center.

In an embodiment, the label is provided on a badge of an agent of the contact center.

In another embodiment, the label is provided on a terminal, or in a vicinity of a terminal of the contact center.

In an embodiment, the identifier is an agent identifier associated with an agent of the contact center.

In another embodiment, the identifier is a terminal identifier associated with a terminal of the contact center.

In an embodiment, the information is contact center information associated with the agent and comprising at least one of contact center configuration data and contact center statistics.

In another embodiment, the information is contact center information associated with the terminal and comprising at least one of contact center configuration data and contact center statistics.

In an embodiment, the overlay of the information is presented in various forms selected from a group consisting of graphs, charts, images, and text.

In an embodiment, the contact center information is stored in a database.

In an embodiment, the console further comprises a location-tracking device arranged to determine a location identifier indicating a location of the console in the contact center.

In an embodiment, the request further includes the location identifier.

In another embodiment, the interface is arranged to transmit to the contact center server, a message including the location identifier.

In an embodiment, the identifier recognition module is arranged to locate the element within the field of view displayed on the screen and scan a label associated with the element to determine the identifier.

In another embodiment, the identifier recognition module includes a face detection application arranged to detect and represent a face of an agent as an agent identifier.

In an embodiment, the request includes an indication of a type or amount of information desired.

In an embodiment, the console includes a user interface arranged to enable a supervisor to modify an organization of information or configuration of the contact center.

In an embodiment, in response to interaction with the user interface to modify an organization of information or configuration of the contact center, the console is arranged to transmit a request via the interface to the contact center server to cause the contact center server to modify the organization of information or configuration of the contact center.

In an embodiment, the user interface is a touch screen interface incorporated into the screen.

In an embodiment, the console comprises a conferencing application arranged to selectively or automatically allow the supervisor to connect to a contact session involving an identified agent or terminal.

In an embodiment, in response to an instigation of the conferencing application, the console is arranged to send a request to the contact center server to cause that contact center server to fork the contact session to the console to enable the supervisor engage in the contact session.

In an embodiment, the console is equipped with hardware including a microphone and speaker to enable the supervisor to participate in the contact session.

In an embodiment, the console is arranged to allocate a portion of real estate of the screen to information associated with the identifier.

In an embodiment, the portion of real estate of the screen allocated to the identifier is based on at least one of a proximity of the console to the element associated with the identifier and an input from the supervisor.

According to a second aspect of the present invention, there is provided a method for monitoring contact center operations, the method comprising:

a) capturing a field of view of a contact center environment;
b) displaying the captured field of view on a screen of a console;
c) determining an identifier from an element in the captured field of view displayed on the screen;
d) transmitting a request including the identifier to a contact center server;
e) receiving from the contact center server, information associated with the identifier; and
f) overlaying the information on the captured field of view to create an augmented reality of the contact center environment on the screen.

According to a third aspect of the present invention, there is provided a system for monitoring contact center operations, the system comprising:

a console comprising:
a camera for capturing a field of view of a contact center environment;
a screen for displaying the captured field of view and an overlay of information to create an augmented reality of the contact center environment on the screen;
an identifier recognition module for determining an identifier from an element in the captured field of view displayed on the screen; and
an interface for transmitting a request including the identifier to a contact center server and receiving from the contact center server, information associated with the identifier; and a contact center server comprising:
a console interface for receiving a request including the identifier from the console and transmitting information associated with the identifier to the console; and
a database interface for fetching information associated with the identifier.

According to a fourth aspect of the present invention, there is provided a method for monitoring contact center operations, the method comprising:

at a console:
capturing a field of view of a contact center environment;
displaying the captured field of view on the screen;
determining an identifier from an element in the captured field of view displayed on the screen;
transmitting a request including the identifier to a contact center server;
receiving from the contact center server, information associated with the identifier; and
overlaying the information on the captured field of view displayed on the screen to create an augmented reality of the contact center environment; and at a contact center:
receiving a request including the identifier from the console;
fetching information associated with the identifier from a database; and
transmitting information associated with the identifier to the console.

In an embodiment, the method further includes:
at the console:
transmitting a secondary identifier to the contact center server; and
at the contact center server:
receiving the secondary identifier from the console; and
determining whether the first and second identifiers are associated with one another.

For example, a first identifier may be an agent identifier determined from a badge of an agent, and a secondary identifier may be an agent identifier determined from a face detection application. In another embodiment, a first identifier may be an agent identifier determined from a badge of an agent, and a secondary identifier may be a terminal identifier scanned from a terminal in close proximity to the agent. On receipt of the two identifiers, the contact center may be arranged to determine whether a relationship exists between the two identifiers, for example, if they correspond with one another or are associated with one another. If the identifiers are determined as being associated with one another, an additional degree of confidence in the identity of the agent and or terminal is realized.

In another embodiment, the method further comprises, at the contact center server, determining as a secondary identifier, an agent recorded as being logged onto a terminal associated with the identifier and determining whether the first and second identifiers are associated with one another.

Thus, an additional degree of confidence in the identity of the agent and or terminal can be realized by cross-referencing the identifier received from the console with an agent logged onto a specific terminal. For example, if the first identifier is an agent identifier, the contact center can determine from the database, the terminal with which that agent identifier is associated. The contact center can further determine the agent logged onto that terminal. If the agent logged onto the terminal is the same as the agent identified by the console, there is an increased chance that the correct agent has been identified. Similarly, if the first identifier is a terminal identifier, the contact center can determine from the database, the agent logged onto that terminal to ensure the same agent has been identified, and accordingly that the correct information is provided to the console.

In an embodiment, the method further comprises, at the contact center server, subject to the first and second identifiers being determined as being associated with one another, transmitting the information associated with the identifier to the console.

In an embodiment, the method further comprises, at the contact center server, subject to the first and second identifiers being determined as not being associated with one another, transmitting an error message to the console.

In an embodiment, the method further comprises, at the contact center server, subject to the first and second identifiers being determined as not being associated with one another, consulting a look-up table to determine which of the indicators is considered as being the more reliable or having a greater probability of being correct, and transmitting to the console, information associated with the indicator identified as being the more reliable indicator.

In an embodiment, the method further comprises, at the contact center server, fetching a subset of information associated with the identifier from a database and transmitting the subset of the information to the console.

In an embodiment, the method further comprises, at the contact center server, subsequent to receiving a request for additional information associated with the identifier, fetching the additional information and transmitting the additional information to the console.

In another embodiment, the method comprises, at the contact center server, subsequent to receiving a location identifier indicating a proximity of the console to an agent or terminal of below a given threshold, transmitting additional information associated with the agent or terminal to the console.

In an embodiment, the method comprises, at the contact center server, responsive to receipt of an indication from the console of a rearrangement of a configuration of the contact center, updating the database to reflect the new configuration.

In an embodiment, the rearrangement of the configuration of the contact center comprises reassigning an agent from one organizational sub-unit, corresponding to a first zone of the contact center, to another organizational sub-unit, corresponding to a second zone of the contact center.

In an embodiment, the organizational sub-units are each arranged to handle contacts of a specific type or nature.

In an embodiment, the method comprises, at the contact center server, subsequent to receiving a location identifier indicating a proximity of the console to an agent or terminal of below a given threshold, connecting the console to a contact session between the agent or terminal and a customer of the contact center.

In an embodiment, the method comprises, at the contact center server, subsequent to receiving a location identifier indicating a proximity of the console to an agent or terminal of below a given threshold, connecting the console to a contact session between the agent or terminal and a customer of the contact center.

In an embodiment, each zone of the contact center is allocated agents and terminals having attributes and applications, respectively, to handle certain types of contacts.

In another embodiment, the method comprises, at the contact center server, subsequent to receiving an identifier, connecting the console to a contact session between an agent or a terminal, associated with the identifier and a customer of the contact center.

In another embodiment, the method comprises, at the contact center server, subsequent to receiving an identifier and a request for conferencing, connecting the console to a contact session between an agent or a terminal, associated with the identifier and a customer of the contact center.

In a further aspect of the present invention, there is provided a computer program product comprising a non-transitory computer readable medium encoded with computer executed instructions, which when executed, are effective to carry out the steps of any of the methods described above.

Further benefits and advantages of the present invention will become apparent from a consideration of the following detailed description given with reference to the accompanying drawings, which specify and show, embodiments of the present invention.

BRIEF DESCRIPTION OF THE DRAWINGS

In order to show how the present invention may be carried into effect, embodiments of the present invention are now described below by way of example only and with reference to the accompanying figures in which.

DETAILED DESCRIPTION

Embodiments of the present invention are described below by way of example only.

Figure 1:
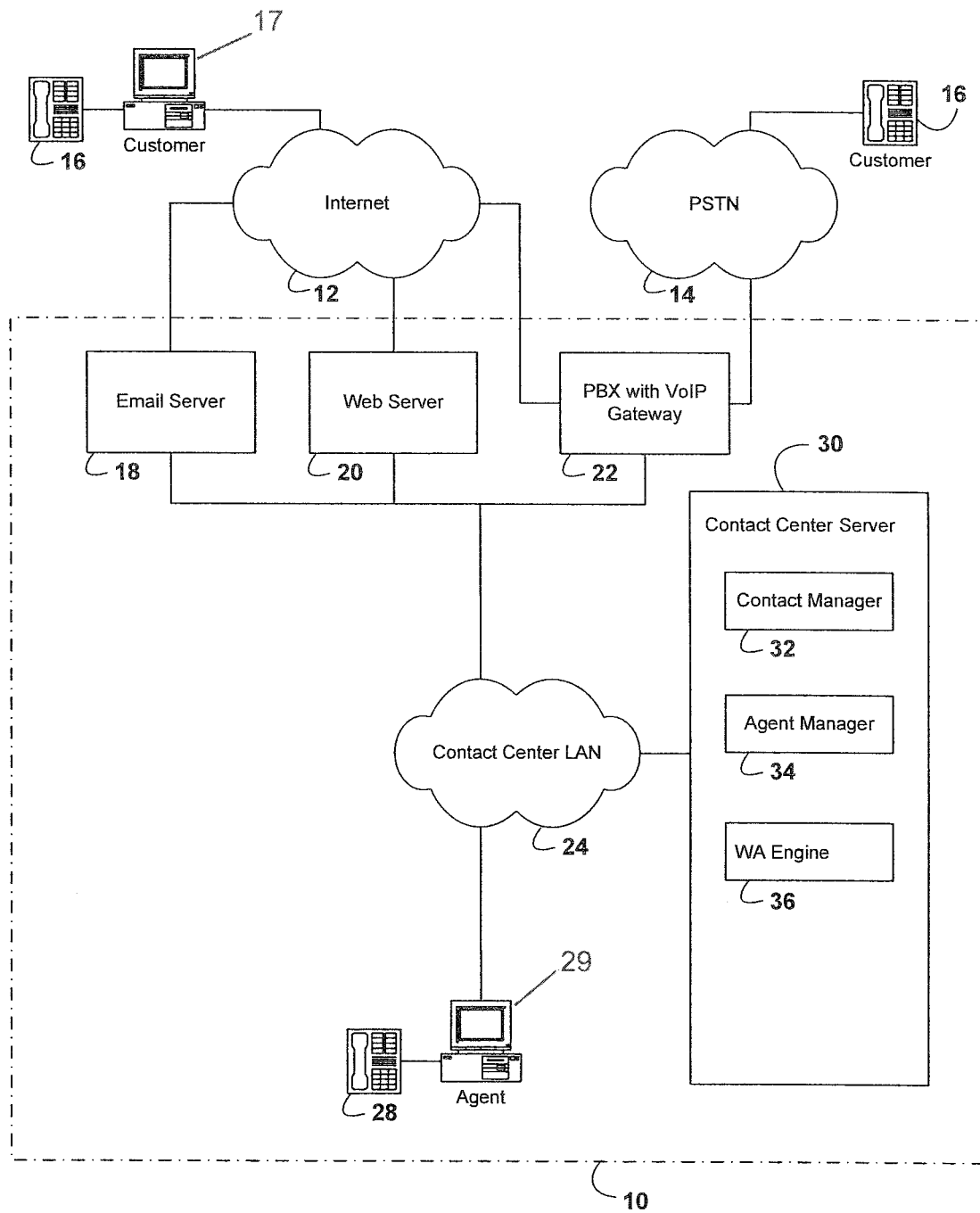
FIG. 1 is a block diagram showing the architecture of a contact center and its environment, according to the an embodiment of the present invention.

Referring to FIG. 1, there is illustrated a conventional contact centre 10. The contact center 10 is connected both to the Internet 12 and to the public switched telephone network (PSTN) 14. Traditional telephony (including voice) communications can of course be via Internet Protocol (IP) based communications, using protocols such as SIP. Customers 16 can contact the contact center 10 by connecting to the Internet 12 via a personal computer 17 running appropriate communications software or a phone 16. Phone 16 may of course be an Internet-enabled phone, or it may connect via the PSTN. In particular, customers can connect to an email server 18, a web server 20 or a private branch exchange (PBX) 22 equipped with a voice over Internet protocol (VOIP) gateway and/or a video interface.

The contact center 10 has a local area network (LAN) 24, which connects each of the servers 18, 20, 22 with a media server/conference bridge 26. A plurality of agents 28 (one of whom is indicated in FIG. 1) are also connected using an agent workstation 29, which is a personal computer equipped with agent client software providing multimedia capabilities to the contact center LAN. It is to be understood that agents may be connected also to the contact center via the Internet 12 or via a wide area network, and they can also be connected over the PSTN. Such distributed contact center architectures are well known and the present invention is not limited to any particular architecture of contact center.

Customers contact the contact center, for example, by making a voice or video call over the Internet or the PSTN, which is handled by the PBX 22. Customers can also make contact by a chat session hosted on the web server 20. In addition to such "live" contact sessions, the contact center 10 can also receive submissions from web forms hosted on the web server 20, or from a customer email, which is received at the email server 18.

A typical contact center, such as the one indicated in FIG. 1, will further comprise a management component such as a contact center server 30 for controlling the operation of the email server 18, web server 20 and PBX 22, to direct contacts to suitable agents. When a contact is received at the respective server, 18, 20, or 22, the contact center server 30 is notified of the existence of a new contact and creates a contact record (not shown), which records details of the received contact such as the time it was received, its source, any customer details which can be deduced based on the source (e.g. the caller line ID or an IP address might be used to reference a customer profile in a database), and the nature of the contact (e.g. customers may have access to a first communication channel for sales or a second communication channel for technical support, etc.). Thereafter, the contacts are analysed and may be handled automatically as far as possible, for example, by using automated response systems and interactive voice response systems, (IVRs).

The contact center server 30 comprises a contact manager 32, an agent manager 34, and a work assignment engine, (WAE) 36, the functions of each of which are typically implemented by appropriate software elements forming part of an overall contact center management application. The contact manager 32, the agent manager 34, and WAE 36 interact with one another to appropriately assign the incoming contacts to one or more suitable agents, for processing.

Embodiments of the present invention are aimed at providing an improved method and system for monitoring contact center operations, and in particular, for monitoring agents in a contact center environment. To this end, embodiments of the present invention avail of an augmented reality of a contact center environment to improve a supervisor's ability to monitor the contact center's operations.

In general, a contact center environment includes a contact center work floor having a plurality of agent terminals, each equipped with systems having interfaces and applications necessary to enable contact center agents to service voice-only call contacts as well as various multimedia contacts from customers or potential customers of the contact center. The agents typically possess skillsets or attributes to enable the processing of the contacts in an appropriate and efficient manner.

Augmented reality, (AR) refers to a live direct or indirect view of a physical, real-world environment whose elements have been augmented by computer sensory input, including sound and graphics. As opposed to virtual reality, where the real-world environment is replaced with simulated world, AR attempts to enhance a current perception of reality.

A company known as Layar, from Amsterdam, The Netherlands, has developed a mobile browser that allows users to find various items based upon augmented reality (AR) technology, a demonstration of which may be viewed from the Layar website or downloading the application software for a mobile phone or device. The Layar browser employs a camera, a compass, Global Positioning System, (GPS) and an accelerometer, to identify a user's field of view and location, and thereby provide an overlay of various data forms over a view from the camera. A more detailed description of the Layar mobile browser is disclosed in the Layar online Support Desk under Frequently Asked Questions/General, Admin Apr. 23, 2010, the entire content of which is incorporated herein by reference.

Figure 2:
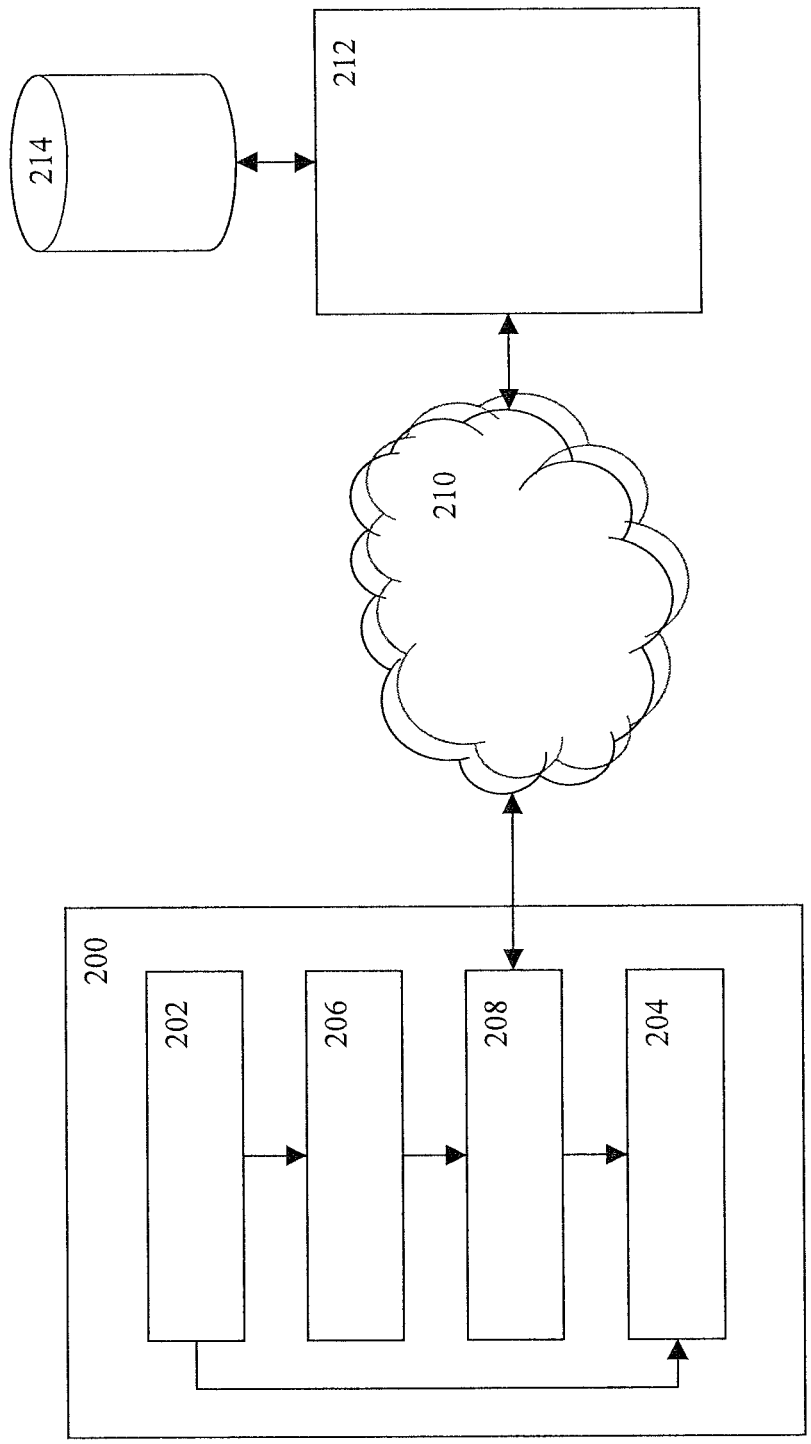
FIG. 2 is a block diagram showing a console for use by a supervisor in a contact center environment, and a contact center server, according to an embodiment of the present invention.

According to an embodiment of the present invention, and as illustrated in FIG. 2, there is provided a console 200 for use by a supervisor in a contact center environment. The console 200 comprises a camera 202 coupled to a screen 204, which is arranged to display, to the supervisor, a field of view or scene captured by the camera 202.

The console 200 is arranged to be held by a user, in particular, a supervisor of a contact center, while the supervisor is walking around the work floor. The field of view captured by the camera 202 is therefore a view of the work floor including agents, and terminals at which the agents are stationed. As the supervisor approaches a physical zone or area of the work floor, the field of view of the camera 202 narrows, focusing in on the zone and an increasing amount of the screen's real estate becomes devoted to those terminals and/or agents in the zone. The supervisor may be able to expand or reduce the field of view by focusing in or out with the camera 202.

In an embodiment, an overlay of contact center information is presented on the screen 204 over the captured field of view to produce an augmented scene of the contact center. Thus, it will be appreciated that the closer the supervisor is to any given terminal and/or agent, the more focused the camera 202 will be on the terminal and/or agent, the more devoted the screen's real estate will be to that terminal and/or agent, and therefore, the more contact center information relating to that terminal and/or agent will be capable of being presented on the screen 204.

The contact center information relates to the terminals and/or agents presented on the screen 204, and may take various data forms as appropriate, including graphs, charts, images, text, etc. Contact center information may comprise contact center statistics and contact center configuration data associated with the displayed terminals and/or agents.

Contact center statistics for a given agent may comprise current and historical agent data. Current agent data may include a number of contacts currently being handled by an agent, for example, three email contacts, a voice call contact and an Instant Messenger (IM) contact, a number of contacts assigned to the agent and awaiting processing, either in a queue or otherwise, a number of pending contacts received at the contact center and which the agent is equipped to handle, etc. Historical agent data may comprise multiple activity codes indicating, for example, a number of contacts handled, types of multimedia contacts handled, average hold time, revenue-to-date accrued, number of contacts handled in a given time period or work shift, performance grade with respect to particular thresholds or targets, cross selling ability, an agent's performance for each stage of a contact period, including a pre-call period, a call period, and a post call period. The pre-call period allows an agent to prepare for the call, the call period is a duration of the call session, a post-call period allows for the agent to update information relating to the contact.

Contact center configuration data for a given agent may include a number and type of contacts an agent is permitted to handle at any one time, skillsets or attributes associated with the agent, one or more terminals to which the agent is assigned at any given time, permission levels for accessing and editing contact center information, a number of physical zones, corresponding to organizational sub units, into which the contact center work floor is divided, a number of terminals and/or agents per zone, etc.

Figure 3:
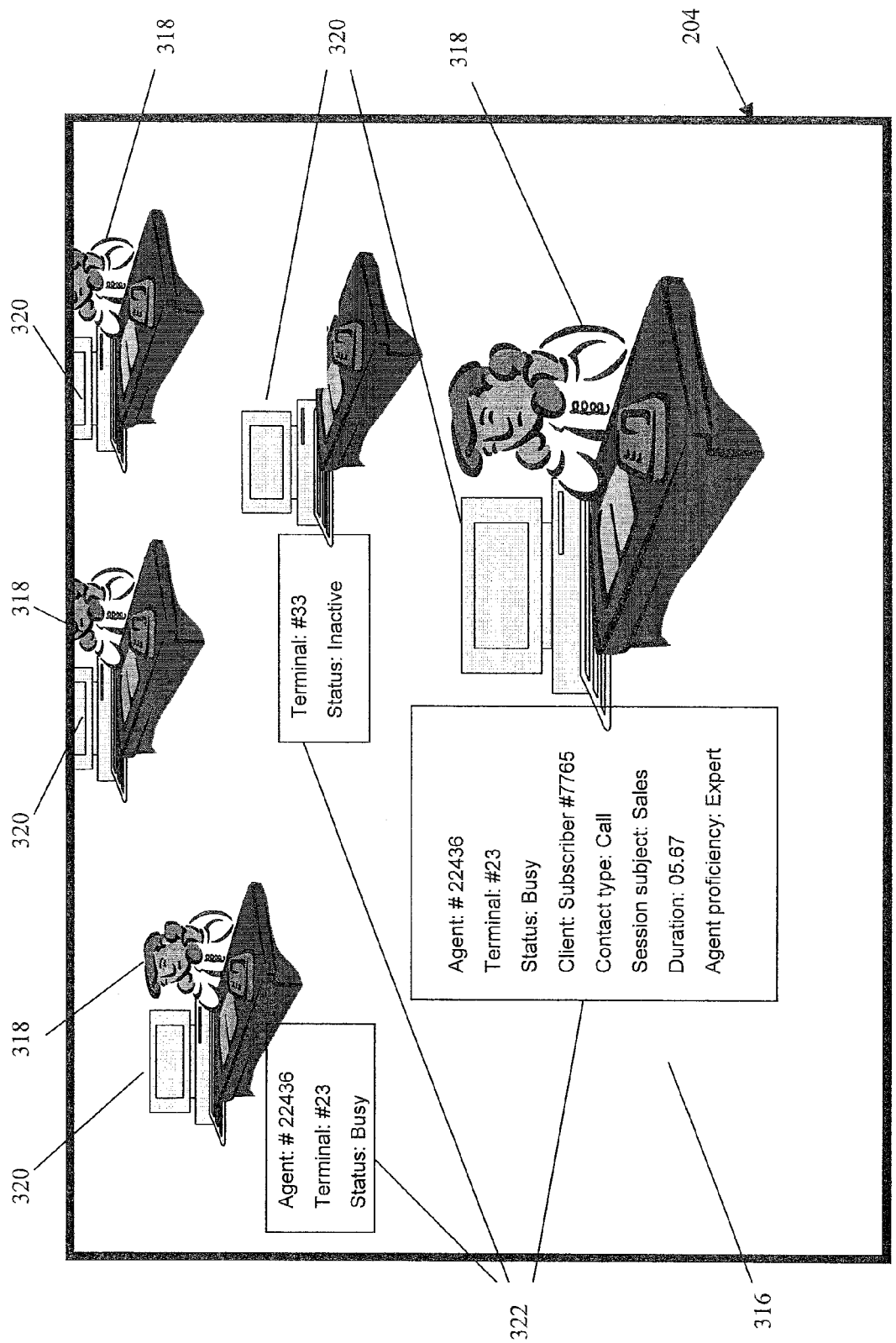
FIG. 3 depicts an augmented reality view of the contact center environment via a screen of the console of FIG. 2.

FIG. 3 depicts an example of an augmented scene of a contact center environment 316 displayed on the screen 204 of the console 200, including a field of view of the camera 202 including terminals 318 and agents 320 and an overlay of contact center information 322 relating to each of the terminals and associated agents.

Referring again to FIG. 2, the contact center information is preferably stored in a database 214, accessible by a contact center server 212. In one embodiment, the contact center database is a remote database and is capable of being accessed by the contact center server 212 via a telecommunications network, such as a telephone network or the Internet. In an alternative embodiment, the contact center database is local to the contact center server 212.

In order to retrieve contact center information to display an augmented scene of the contact center environment on the screen 204, the console 200 includes a contact center client interface 208 arranged to communicate with the contact center server 212 via a communications network 210.

In particular, the contact center client interface 208 is arranged to transmit a request to the contact center server 212 including an identifier indicating at least one agent and/or terminal for which contact center information is required. In response to the request, the contact center server 212 queries the database 214 for the relevant information and provides the information to the console 200.

As discussed, the request transmitted to the contact center server 212 includes an identifier of the terminal and/or agent for which the information is required. To this end, the console 200 includes an identifier recognition module 206, which is arranged to determine a terminal or agent identifier from the captured field of view.

Computer readable tags or labels are preferably used as agent and/or terminal identifiers and the identifier recognition module 206 is equipped with the necessary applications to read or scan the tags or labels. Examples of such labels or tags include 1 dimensional (1D) barcodes, 2 dimensional (2D) barcodes, for example, QR codes or JAGTAGS, or RFIDs.

In one embodiment, each contact center agent is assigned to a specified terminal and each terminal displays a terminal identifier tag. However, it will be appreciated that the terminal identifier tag may be positioned in any suitable location, for example, on a cubicle housing the terminal, on a wall or floor of the work floor, or in a vicinity of the terminal. The identifier recognition module 206 is arranged to read the terminal identifier tag to determine a terminal identifier for including in a request for information to be sent to the contact center server 212.

On receipt of the terminal identifier, the contact center server 212 retrieves information associated with the terminal identified by the terminal identifier from the contact center database 214 and transmits the information to the contact center client interface 208 to be overlaid on captured field of view or scene to present an augmented view of the contact center environment. As discussed above, the contact center configuration information stored in the database 214 records the terminal to which each agent is assigned, and therefore the information may be associated with the terminal and/or an agent associated or assumed to be stationed at the terminal.

Figure 4:
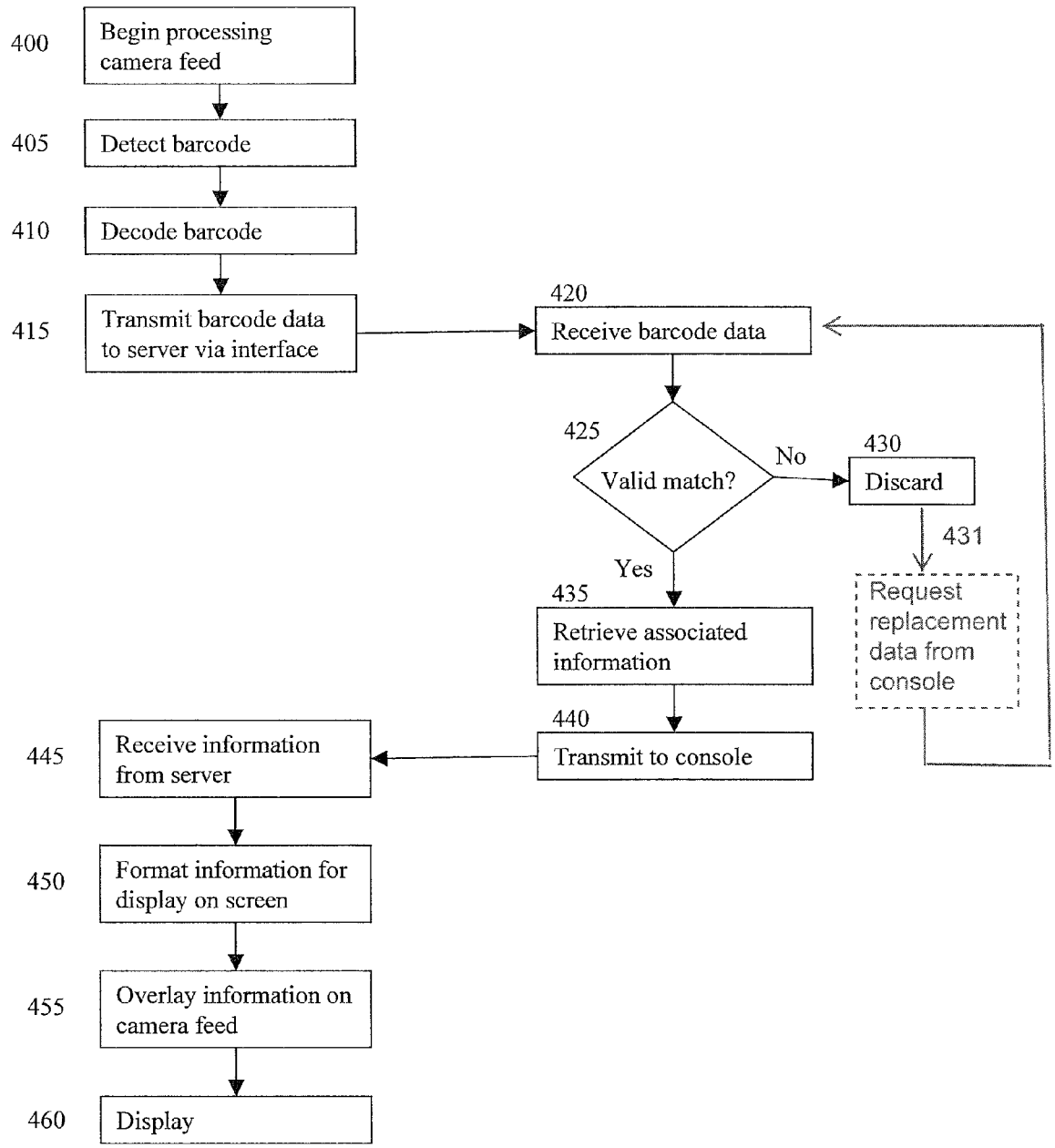
FIG. 4 is a flow diagram depicting the steps performed by the console and contact center server of FIG. 2 in accordance with an embodiment of the present invention.

Referring to FIG. 4, there is depicted a flow diagram of the steps performed in accordance with an embodiment of the present invention. Once the camera 202 of the console 200 begins processing 400 a camera feed of the contact center environment, the identifier recognition module 206 detects 405 and decodes 410 a terminal identifier tag, for example, a barcode associated with the terminal. Data associated with the tag or barcode is then transmitted 415 to the contact center server 212 via interface 208. The contact center server 212 receives 420 the barcode data and determines 425 whether it constitutes a valid match with information stored in the database 214. If no match can be made, the data is discarded 430, and in one embodiment, a request 431 for replacement data may be transmitted to the console 200. If a match is made between the data and information in the database, the associated information is retrieved 435 and transmitted 440 to the console 200. The console receives 445 the information from the contact center server 212 via the interface 208 and formats 450 the information for display on the screen 204. The formatted information is then overlaid 455 on the camera feed and displayed 460 to the supervisor.

In another embodiment, the console 200 includes GPS and/or WiFi location tracking to determine a location of the supervisor on the contact center floor. This location information is utilized as an identifier and transmitted in a request to the contact center for information relating to the terminal and/or agent in the vicinity of the supervisor. On receipt of the identifier, the contact center server 212 queries the database 214 to determine from the contact center configuration, the terminal located at the location identified by the identifier and the agent assigned to that terminal at a given time, for example, the transmission time of the request. Once the terminal and/or agent is identified, the contact center server 212 retrieves the contact center information requested and transmits it to the contact center client interface 208 for presentation on the screen 204 to thereby display an augmented scene or view of the contact center environment.

It will, however, be appreciated that for any number of reasons, a second agent may utilize a terminal assigned to another agent. For example, if a second agent manned a terminal of a first agent for a short period of time, or if the terminal of the second agent was out of order, and the other agent wasn't present, or if a system of "hot desking" is being implemented, wherein two agents working different shifts share a single terminal and temporarily swap shifts. Thus, the information relating to an agent associated with the identified terminal may not actually relate to that agent who is currently manning the identified terminal.

Thus, an additional measure may be performed in order to provide a reinforced degree of confidence in the identification of the correct agent. This additional measure requires the agents to log on to the system, and preferably supply a password, when beginning a shift or session. As is usually the case, the terminals are connected to the contact center server 212, via a communications network. Once an agent logs on to the terminal's system, a signal is supplied to the contact center server 212. The contact center server 212 is then arranged to create or update a field in the contact center configuration data stored in the database 214 to reflect the agent as currently logged on to the terminal.

To mitigate the chance that the agent associated with the identified terminal is not in fact the agent manning the terminal, the contact center server 212 is arranged to query the contact center configuration data to determine the agent recorded as being logged onto the identified terminal's system. If the agent recorded as being logged on corresponds with the expected agent, i.e., the agent assigned to the terminal, the contact center server 212 delivers the requested information to the contact center client interface 208 of the console 200. However, if the agent recorded as being logged on does not correspond with the expected agent, an error message may be transmitted to the console, indicating that further information is required to identify the agent manning the terminal, such as the agent identifier discussed below with respect to a third and fourth embodiment. In another embodiment, it may be the case that the agent recorded as being logged on is considered as a more reliable identification, and overrides the agent recorded in the database as being the agent associated with the terminal, and accordingly, the contact center server 212 returns information relating to the logged on agent to the console 200.

Figure 5:
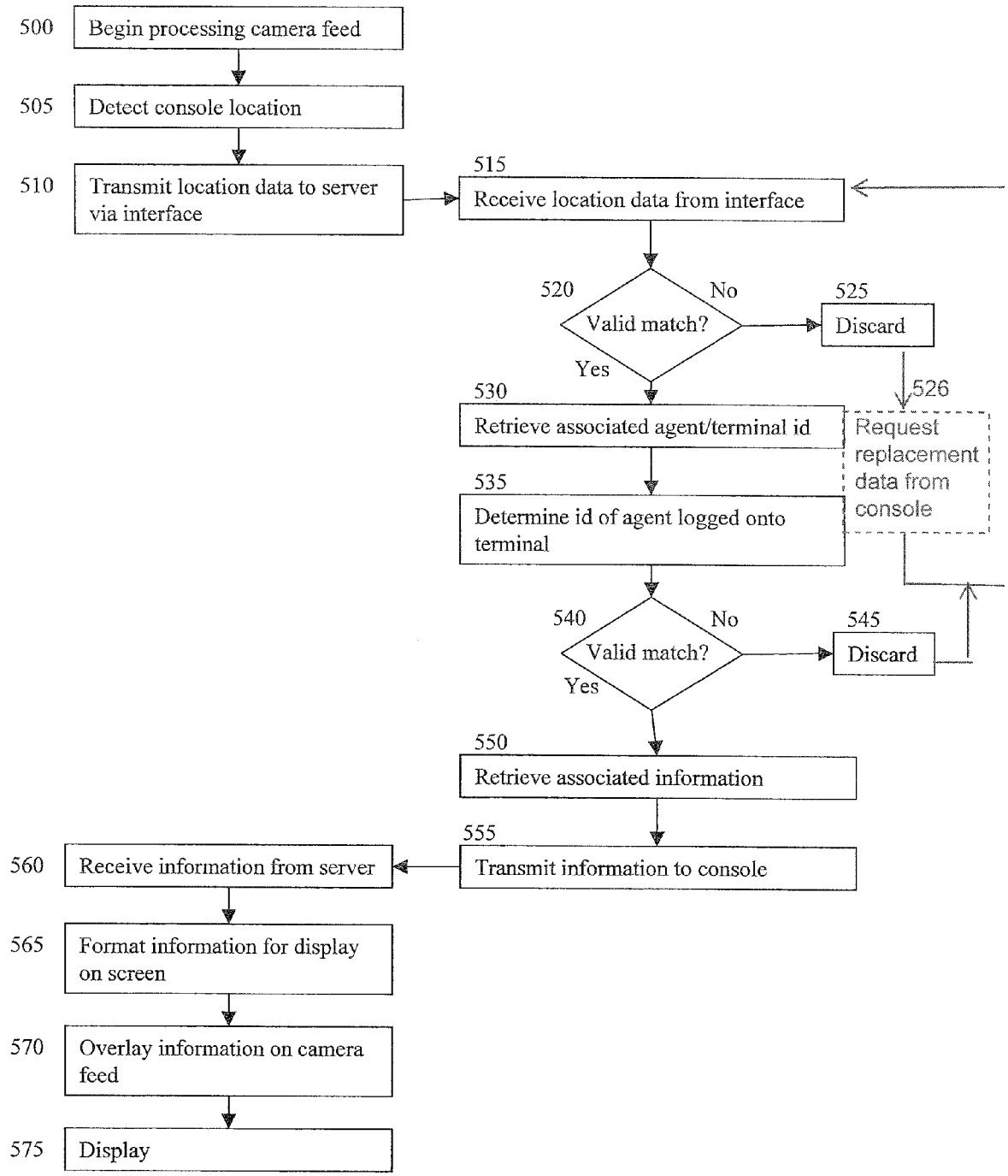
FIG. 5 is a flow diagram depicting the steps performed by the console and contact center server of FIG. 2 in accordance with an embodiment of the present invention.

Referring to FIG. 5, there is depicted a flow diagram of the steps performed in accordance with an embodiment. When the console 200 is activated, the camera 202 beings processing 500 a camera feed of the contact center environment. The location, and preferably, the orientation of the console 200, and therefore assumedly the supervisor, is detected 505 and the location data is transmitted 510 to the contact center server 212 via interface 208. The contact center server 212 receives 515 the location data and determines 520 whether it constitutes a valid match with information stored in the database 214, for example by determining whether an entry in the database identifies an agent or terminal associated with the position on the contact center floor identified by the location data. If no match can be made the data is discarded 525, and in one embodiment, a request for replacement data 526 may be transmitted to the console 200. If a match is made between the data and information in the database, the associated agent and or terminal identifier is retrieved 530 from a database. The identifier of the agent logged onto the terminal identified, or the terminal associated with the identified agent is determined 535. The contact center server 212 determines 540 whether the identity of the logged on agent matches the identity of the agent identified by the location information. If no match can be made the data is discarded 545, and in one embodiment, a request for replacement data 526 may be transmitted to the console 200. If a match is made, the information associated with the identified agent is retrieved 550 from a database and transmitted 555 to the console 200. The console receives 560 the information from the contact center server 212 via the interface 208 and formats 565 the information for display on the screen 204. The formatted information is then overlaid 570 on the camera feed and displayed 575 to the supervisor.

However, it will be appreciated that the contact center configuration data may be arranged to record the specifics of "hot desking" and update the reassignment of agents to terminal for temporary periods. In such cases, the terminal identifier tag may be considered as being sufficient to identify the agent manning the terminal to be identified with an acceptable degree of confidence. However, it will be further appreciated that an additional check of the agent recorded as being currently "logged on" to the terminal may also be carried out to provide an extra level of confidence.

In the third embodiment, agents are provided with badges displaying an agent identifier tag and the identifier recognition module 206 is arranged to read or scan the agent identifier tag to determine an agent identifier for transmission in the request to the contact center server 212. On receipt of the agent identifier, the contact center server 212 retrieves, from the contact center database 214, information associated with the agent identified by the agent identifier and transmits the information to the contact center client interface 208 to be overlaid on the screen 204 presenting the captured field of view of the contact center environment.

Figure 6:
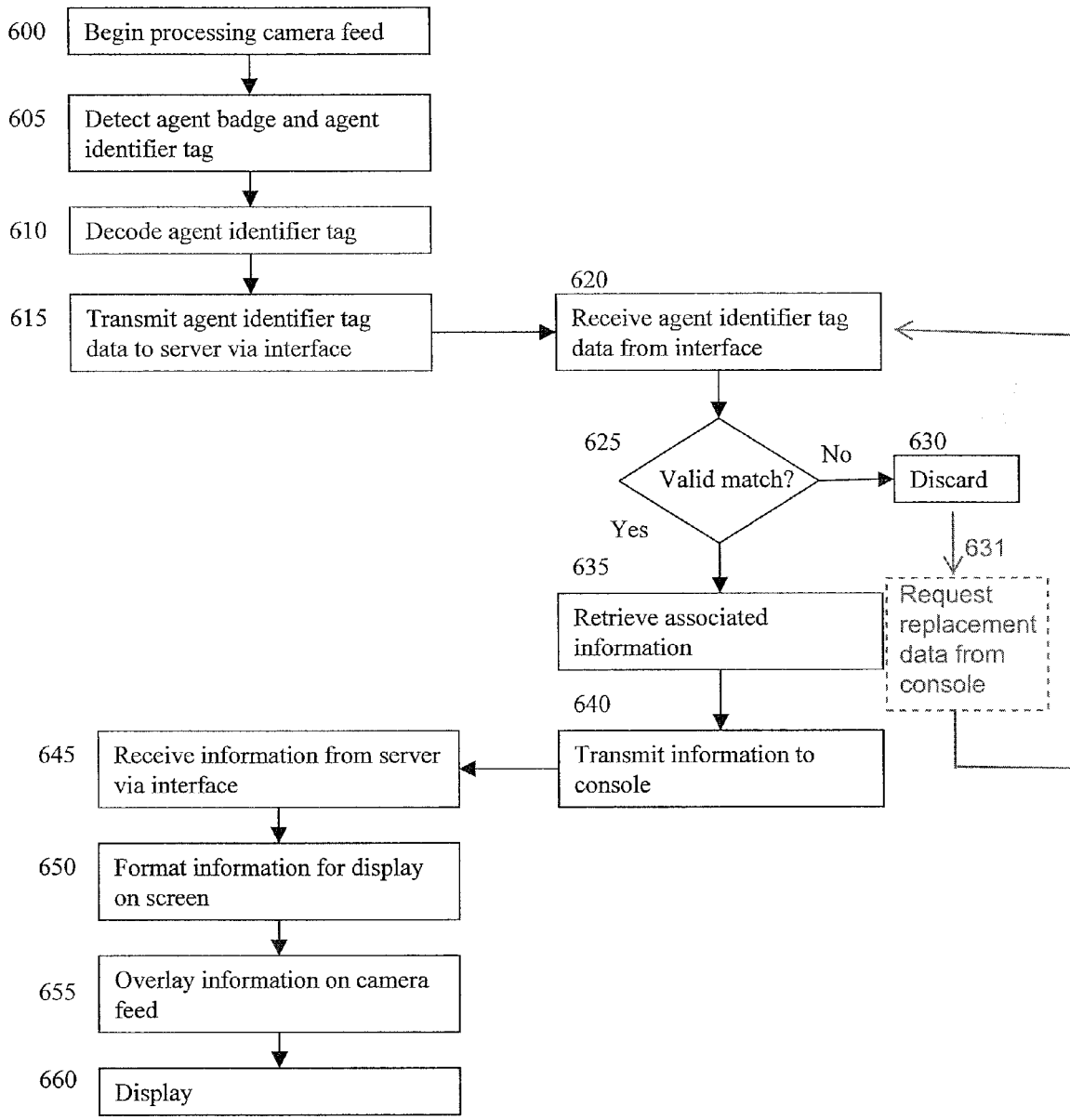
FIG. 6 is a flow diagram depicting the steps performed by the console and contact center server of FIG. 2 in accordance with an embodiment of the present invention.

Referring to FIG. 6, there is depicted a flow diagram of the steps performed in accordance with another embodiment. Once the camera 202 of the console 200 beings processing 600 a camera feed of the contact center environment, the identifier recognition module 206 detects 605 and decodes 610 an agent identifier tag, for example, a barcode displayed on an agent's identity badge. Data associated with the tag or barcode is then transmitted 615 to the contact center server 212 via interface 208. The contact center server 212 receives 620 the agent identifier tag data and determines 625 whether it constitutes a valid match with information stored in the database 214. If no match can be made, the data is discarded 630, and in an embodiment, a request for replacement data 631 may be transmitted to the console 200. If a match is made between the data and information in the database, the associated information is retrieved 635 and transmitted 640 to the console 200. The console receives 645 the information from the contact center server 212 via the interface 208 and formats 650 the information for display on the screen 204. The formatted information is then overlaid 655 on the camera feed and displayed 660 to the supervisor.

In another embodiment, the identifier recognition module 206 is equipped with face tracking and detection software to enable a representation of an agent at a terminal captured in the field of view to be detected and utilized as an indicator for identifying the agent. This representation constitutes an agent identifier that is transmitted to the contact center server 212 in the request. On receipt of the agent identifier, the contact center server 212 executes a face-matching algorithm to find a closest match of the representation with a set of stored representations of faces of agents in the contact center, and thereby identifies the agent in question. Once identified, the contact center server 212 retrieves from the contact center database, the relevant requested information, and transmits it to the console 200 to be displayed on the screen 204 such that it overlays the view of contact center environment.

Figure 7:
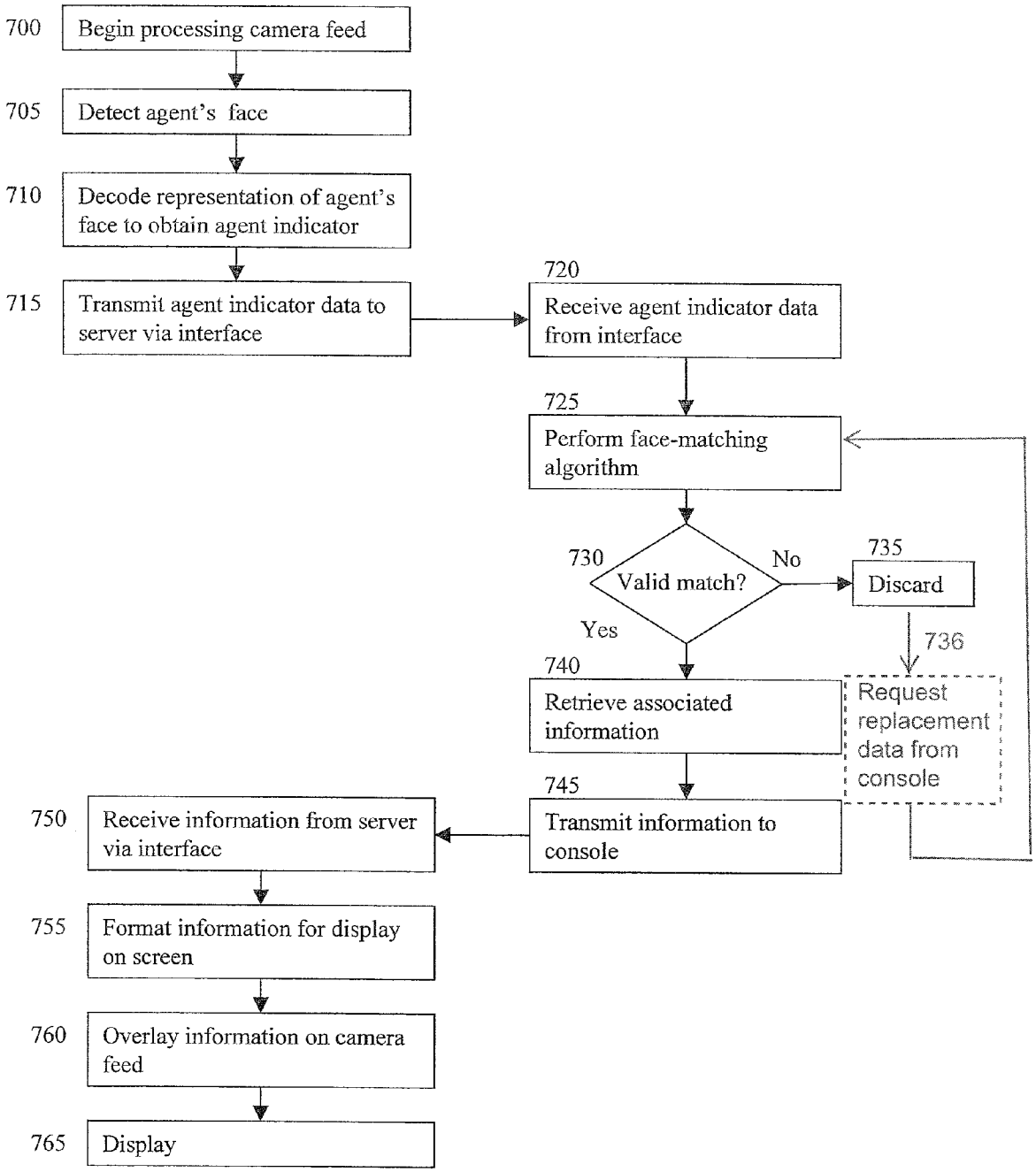
FIG. 7 is a flow diagram depicting the steps performed by the console and contact center server of FIG. 2 in accordance with an embodiment of the present invention

Referring to FIG. 7, there is depicted a flow diagram of the steps performed in accordance with this fourth embodiment. Once the camera 202 of the console 200 beings processing 700 a camera feed of the contact center environment, the identifier recognition module 206 detects 705 a face of an agent and decodes 710 a representation of the face to determine agent indicator data. The agent indicator data is then transmitted 715 to the contact center server 212 via interface 208. The contact center server 212 receives 720 the agent indicator data and performs 725 a face matching algorithm to determine whether an agent or agent terminal associated with the agent indicator data can be determined from the database 214. If no match can be made, the data is discarded 730, and in an embodiment, a request for replacement data 736 may be transmitted to the console 200. If a match is made between the data and information in the database, the associated information is retrieved 735 and transmitted 740 to the console 200. The console receives 745 the information from the contact center server 212 via the interface 208 and formats 750 the information for display on the screen 204. The formatted information is then overlaid 755 on the camera feed and displayed 760 to the supervisor.

Similarly, the identification of the agent recorded as being logged on to the associated terminal's system may be utilized to perform an additional check as described above with respect to other embodiments. In this case, the additional check is performed to mitigate the chances that the terminal recorded as being associated with the identified agent is not the terminal that is currently being manned by the identified agent.

It will, however, be appreciated that any combination of the above embodiments may be employed to increase the degree of confidence in the identity of the agent and/or terminal presented on the screen 204 of the console 200. For example, both a terminal identifier, as described in the first and/or second embodiment, and an agent identifier, as described in the third and/or fourth embodiment may be provided to the contact center server 212 in an attempt to improve the accuracy of information to be presented on the screen 204. Furthermore, the contact center server 212 may also query the database 214 to identify the currently logged on of the identified terminal or associated terminal as applicable, to further improve the accuracy of the information.

In such embodiments, it is appreciated that conflicting indicators may be provided to the contact center server 212. In such cases, the contact center server 212 is arranged to consult a look up table, which associates a probability of correctness to each of the identifiers, and each combination of the identifiers. Thus, in some embodiments, as opposed to sending an error message to the console 200, the contact center server 212 makes a "best guess" at the identity of the agent and/or terminal based on statistics stored in the look-up table. For example, an agent identifier determined from face recognition methods may be considered less reliable than a terminal identifier, and if presented with these two conflicting identifiers, the look-up table may instruct the contact center server 212 to select the agent associated with the terminal identifier as the correct agent. However, if the agent logged on to the terminal's system was identified as being the same agent identified by the face recognition process, the look-up table may instruct the contact center server 212 to select the identified and logged on agent as the correct agent.

The information stored in the database 214, and in particular, the contact center statistics information can comprise a vast amount of data per agent. However, it is sometimes the case that the information required by the supervisor for overlaying the camera view displayed on the screen 204 comprises a subset of the total quantity of information available for any given agent and/or terminal. Therefore, the contact center server 212 preferably filters the information to be provided to the contact center client interface 208.

For example, the contact center server 212 may initially provide the console with a first level of information, providing basic contact center information only, such as the current number of contacts the agent is handling and the skills associated with that agent. As the supervisor approaches the agent, and the agent subsequently occupies a greater portion of the real estate of the screen 204, the console 200 may initiate a request to the contact center server 212 for further information, for example historical activity codes associated with the agent for the previous week, and a number of currently awaiting processing for which the agent is trained or skilled at handling, or revenue generated in the previous two days. Alternatively or in addition, the console may be arranged to receive a portion of data relating to an agent, and may determine a subset of the information to be displayed on the screen depending on a supervisor's preferences, or the available screen real estate allocated to the agent.

Further, it will be appreciated that a request for specific information for a particular agent may be requested and subsequently provided to the console 200 by the contact center server as required. It will be appreciated that any number of filters may be implemented and each filter may be designed to accommodate various types and amounts of information, depending on the environment in which they are to be employed.

The console 200 preferably further comprises a user interface, and preferably, a touch screen interface integrated with the screen 204 of the console. However, it will be appreciated that any suitable type of user interface may be employed. In one embodiment, the interface is equipped with an "Avaya Flare" desktop application and employs an "Avaya Aura" Contact Center multimedia work assignment application, ("Avaya Flare" and "Avaya Aura" are trademarks of Avaya Inc.).

A supervisor may interact with the user interface to modify the organization of information and configuration of the contact center. For example, the supervisor may instigate the transferal of information from the contact center server 212 to the console 200, or transfer the type of contacts being assigned or selected by an agent, by interacting with the user interface. As previously indicated, the contact center work floor may comprise multiple physical zones, each comprising agents and terminals. In one embodiment, each zone is allocated agents and terminals having attributes and software to handle a certain type of contacts. Thus, an agent who infers from being physically present on the work floor, that agents of a first zone appear overworked or stressed or excessively busy while agents of another zone are relatively idle, can rearrange the zones by transferring agents from one organizational sub-unit associated with the zone to another, or alternatively, can temporarily assign agents from the second zone, contacts allocated for processing by the agents of the first zone.

In another embodiment, the console 200 provides a capability for a supervisor to conference in on a call session between an agent and a customer or potential customer of the contact center as the supervisor is walking along the work floor. As the supervisor approaches a vicinity of an agent engaged in a "live" contact session, for example, a call, video, or IM contact session, the supervisor can automatically or selectively conference in on the session.

For example, once an agent or terminal is determined as occupying a certain percentage of the real estate of the screen 204, or on selection of a specific agent or terminal by the supervisor, the contact center server 212 may be arranged to automatically, or once approval has been received from the supervisor, fork the session to the console 200. The supervisor may then choose to usurp the session, "whisper" to the agent to assist in the handling of the contact, partake in the session, or simple listen to the session.

As the supervisor moves away from the agent and/or terminal and is no longer in the vicinity of the agent, the supervisor may be disconnected from the session, and perhaps reconnected to a session of another agent as the supervisor moves into a vicinity of the other agent or alternatively, manually chooses an agent displayed in the augmented view of the screen 204 whose session they wish to conference in on.

The present invention is not limited to the embodiment(s) described herein but can be amended or modified without departing from the scope of the present invention.

The invention claimed is:

1. A console for monitoring contact center operations, the console comprising:
 a camera for capturing a field of view of a contact center environment;
 a screen for displaying the captured field of view;
 an identifier recognition module for determining an identifier from an element in the captured field of view displayed on the screen; and
 an interface for transmitting a request including the identifier to a contact center server and receiving from the contact center server, information associated with the identifier;
 wherein the screen is further arranged to display an overlay of the information on the captured field of view, to create an augmented reality of the contact center environment on the screen.

2. The console of claim 1 wherein the identifier is a label or tag selected from the group consisting of 1 dimensional barcodes, 2 dimensional barcodes, QR codes, JAGTAGS, and RFIDs.

3. The console of claim 1 wherein the element is an agent or terminal of the contact center.

4. The console of claim 2 wherein the label is provided on a badge of an agent of the contact center.

5. The console of claim 2 wherein label is provided on a terminal, or in a vicinity of a terminal of the contact center.

6. The console of claim 1 wherein the identifier is an agent identifier associated with an agent of the contact center.

7. The console of claim 1 wherein the identifier is a terminal identifier associated with a terminal of the contact center.

8. The console of claim 1 wherein the information is contact center information associated with the agent and comprising at least one of contact center configuration data and contact center statistics.

9. The console of claim 1 wherein the information is contact center information associated with the terminal and comprising at least one of contact center configuration data and contact center statistics.

10. The console of claim 1 wherein the overlay of the information is presented in various forms selected from a group consisting of graphs, charts, images, and text.

11. The console of claim 1 wherein the contact center information is stored in a database.

12. The console of claim 1 further comprising a location-tracking device arranged to determine a location identifier indicating a location of the console in the contact center.

13. The console of claim 12 wherein the request further includes the location identifier.

14. The console of claim 12 wherein the interface is arranged to transmit to the contact center server, a message including the location identifier.

15. The console of claim 1 wherein the identifier recognition module is arranged to locate the element within the field of view displayed on the screen and scan a label associated with the element to determine the identifier.

16. The console of claim 1 wherein the identifier recognition module includes a face detection application arranged to detect and represent a face of an agent as an agent identifier.

17. The console of claim 1 wherein the request comprises an indication of a type or amount of information desired.

18. The console of claim 1 further comprising a user interface arranged to enable a supervisor to modify an organization of information or configuration of the contact center.

19. The console of claim 18 wherein, in response to interaction with the user interface to modify an organization of information or configuration of the contact center, the console is arranged to transmit a request via the interface to the contact center server to cause the contact center server to modify the organization of information or configuration of the contact center.

20. The console of claim 18 wherein the user interface is a touch screen interface incorporated into the screen.

21. The console of claim 1 further comprising a conferencing application arranged to selectively or automatically allow a supervisor to connect to a contact session involving an identified agent or terminal.

22. The console of claim 21 wherein, in response to an instigation of the conferencing application, the console is arranged to send a request to the contact center server to cause that contact center server to fork the contact session to the console to enable the supervisor engage in the contact session.

23. The console of claim 21 further comprising hardware including a microphone and speaker to enable the supervisor to participate in the contact session.

24. The console of claim 1, wherein the console is arranged to allocate a portion of real estate of the screen to information associated with the identifier.

25. The console of claim 24 wherein the portion of real estate of the screen allocated to the identifier is based on at least one of a proximity of the console to the element associated with the identifier and an input from a supervisor.

26. A method for monitoring contact center operations, the method comprising:
a) capturing a field of view of a contact center environment;
b) displaying the captured field of view on a screen of a console;
c) determining an identifier from an element in the captured field of view displayed on the screen;
d) transmitting a request including the identifier to a contact center server;
e) receiving from the contact center server, information associated with the identifier; and
f) overlaying the information on the captured field of view to create an augmented reality of the contact center environment on the screen.

27. A computer program product comprising a non-transitory computer readable medium encoded with computer executed instructions, which when executed, are effective to carry out the steps of claim 26.

28. A system for monitoring contact center operations, the system including:
a console comprising:
a camera for capturing a field of view of a contact center environment;
a screen for displaying the captured field of view and an overlay of information to create an augmented reality of the contact center environment on the screen;
an identifier recognition module for determining an identifier from an element in the captured field of view displayed on the screen; and
an interface for transmitting a request including the identifier to a contact center server and receiving from the contact center server, information associated with the identifier; and
a contact center server comprising:
a console interface for receiving a request including the identifier from the console and transmitting information associated with the identifier to the console; and
a database interface for fetching information associated with the identifier.

29. A method for monitoring contact center operations, the method including:
at a console:
capturing a field of view of a contact center environment;
displaying the captured field of view on a screen;
determining an identifier from an element in the captured field of view displayed on the screen;
transmitting a request including the identifier to a contact center server;
receiving from the contact center server, information associated with the identifier; and
overlaying the information on the captured field of view displayed on the screen to create an augmented reality of the contact center environment; and
at a contact center:
receiving a request including the identifier from the console;
fetching information associated with the identifier from a database; and
transmitting information associated with the identifier to the console.

30. The method of claim 29 further comprising:
at the console:
transmitting a second identifier to the contact center server; and
at the contact center server:
receiving the second identifier from the console; and
determining whether the identifier and the second identifier are associated with one another.

31. The method of claim 29 further comprising:
at the contact center server:
    determining as a second identifier, an agent recorded as being logged onto a terminal associated with the identifier; and
    determining whether the identifier and the second identifier are associated with one another.

32. The method of claim 31 further comprising:
at the contact center server:
    subject to the identifier and the second identifier being determined as being associated with one another, transmitting the information associated with the identifier to the console.

33. The method of claim 31 further comprising:
at the contact center server:
    subject to the identifier and the second identifier being determined as not being associated with one another, transmitting an error message to the console.

34. The method of claim 31 further comprising:
at the contact center server:
    subject to the identifier and the second identifier being determined as not being associated with one another, consulting a look-up table to determine which of the identifier and the second identifier are considered as being the more reliable or having a greater probability of being correct; and
    transmitting to the console, information associated with the identifier identified as being the more reliable identifier.

35. The method of claim 29 further comprising:
at the contact center server:
    fetching a subset of information associated with the identifier from a database and transmitting the subset of the information to the console.

36. The method of claim 29 further comprising:
at the contact center server:
    subsequent to receiving a request for additional information associated with the identifier, fetching the additional information; and
    transmitting the additional information to the console.

37. The method of claim 29 further comprising:
at the contact center server:
    subsequent to receiving a location identifier indicating a proximity of the console to an agent or terminal of below a given threshold, transmitting additional information associated with the agent or terminal to the console.

38. The method of claim 29 further comprising:
at the contact center server:
    responsive to receipt of an indication from the console of a rearrangement of a configuration of the contact center, updating the database to reflect the rearrangement of the configuration.

39. The method of claim 38 wherein the rearrangement of the configuration of the contact center involves reassigning an agent from one organizational sub-unit, corresponding to a first zone of the contact center, to another organizational sub-unit, corresponding to a second zone of the contact center.

40. The method of claim 39 wherein organizational sub-units are each arranged to handle contacts of a specific type or nature.

41. The method of claim 29 further comprising:
at the contact center server:
    subsequent to receiving a location identifier indicating a proximity of the console to an agent or terminal of below a given threshold, connecting the console to a contact session between the agent or terminal and a customer of the contact center.

42. The method of claim 29 further comprising:
at the contact center server:
    subsequent to receiving a location identifier indicating a proximity of the console to an agent or terminal of below a given threshold, connecting the console to a contact session between the agent or terminal and a customer of the contact center.

43. The method of claim 39 wherein each zone of the contact center is allocated agents and terminals having attributes and applications, respectively, to handle certain types of contacts.

44. The method of claim 29 further comprising:
at the contact center server:
    subsequent to receiving an identifier, connecting the console to a contact session between an agent or a terminal, associated with the identifier and a customer of the contact center.

45. The method of claim 29 further comprising:
at the contact center server:
    subsequent to receiving an identifier and a request for conferencing, connecting the console to a contact session between an agent or a terminal, associated with the identifier and a customer of the contact center.

* * * * *